US009436926B2

(12) United States Patent
Cousins et al.

(10) Patent No.: US 9,436,926 B2
(45) Date of Patent: Sep. 6, 2016

(54) ENTRYWAY BASED AUTHENTICATION SYSTEM

(71) Applicant: Savioke, Inc., Sunnyvale, CA (US)

(72) Inventors: Steve Cousins, Sunnyvale, CA (US); Jonathan Binney, Sunnyvale, CA (US); Chad Rockey, San Bruno, CA (US); Adrian Canoso, Menlo Part, CA (US)

(73) Assignee: Savioke, Inc., San Jose, CA (US)

( * ) Notice: Subject to any disclaimer, the term of this patent is extended or adjusted under 35 U.S.C. 154(b) by 0 days.

(21) Appl. No.: 14/530,677

(22) Filed: Oct. 31, 2014

(65) Prior Publication Data
US 2015/0242806 A1 Aug. 27, 2015

Related U.S. Application Data

(60) Provisional application No. 61/944,524, filed on Feb. 25, 2014.

(51) Int. Cl.
| | |
|---|---|
| *G01C 21/00* | (2006.01) |
| *G06F 19/00* | (2011.01) |
| *G06Q 10/08* | (2012.01) |
| *G05D 1/02* | (2006.01) |

(52) U.S. Cl.
CPC .......... *G06Q 10/087* (2013.01); *G05D 1/0246* (2013.01); *G05D 1/0274* (2013.01); *G05D 2201/0211* (2013.01)

(58) Field of Classification Search
CPC .. G06F 21/32; G07C 9/0087; G07C 9/00158
USPC ........... 701/2, 23, 422, 436, 437, 301, 302; 700/245, 248, 261, 900; 318/568.11, 318/568.12, 568.2
See application file for complete search history.

(56) References Cited

U.S. PATENT DOCUMENTS

| | | | |
|---|---|---|---|
| 6,584,375 B2 * | 6/2003 | Bancroft ................. | A47F 10/00 235/383 |
| 7,066,291 B2 * | 6/2006 | Martins ................... | B25J 5/007 180/167 |
| 8,010,230 B2 * | 8/2011 | Zini ................. | G05B 19/41895 700/245 |
| 2004/0158351 A1 * | 8/2004 | Rivalto ................. | G06Q 10/08 700/237 |
| 2015/0071524 A1 * | 3/2015 | Lee ....................... | G06T 7/0075 382/154 |

OTHER PUBLICATIONS

International Search Report for PCT Application No. PCT/US2015/015264 having an international filing date of Feb. 15, 2015.
Written Opinion of the Internatinal Searching Authority for PCT Application No. PCT/US2015/015264 having an international filing date of Feb. 15, 2015.

* cited by examiner

*Primary Examiner* — Muhammad Shafi (57) ABSTRACT

A system can include at least one robot configured to autonomously navigate from a first location to a destination zone, the at least one robot having a generally cylindrical shape and including a storage container for storing at least one item for delivery, a plurality of image based depth sensor mounted proximate a top end of the robot, and a controller configured to navigate to the destination zone and to authenticate a delivery target for the item.

18 Claims, 5 Drawing Sheets

ENTRYWAY BASED AUTHENTICATION SYSTEM

CROSS-REFERENCE TO RELATED APPLICATIONS

This application claims the benefit of U.S. Provisional Patent Application Ser. No. 61/944,524 filed on Feb. 25, 2014, the contents of which are incorporated by reference herein.

TECHNICAL FIELD

The present disclosure relates generally to authentication of persons and/or objects at predetermined locations, including authentication of persons at particular locales, such as doorways and/or entryways.

BACKGROUND

Facilitating delivery or receipt of packages using mobile autonomous robots can improve service to residents and staff in hospitality spaces including hotels, nursing homes, hospitals, residential apartment buildings, or office buildings. For example, a hotel guest can order room service, and an autonomous robotic delivery service could deliver the guest's order directly to their door. After authentication of the delivery recipient, the package can be made available to the hotel guest. Authentication typically requires that a guest take deliberate actions to identify themselves. For example, a recipient can sign for their delivery, use a provided RFID dongle or key card, or enter a passcode to confirm identity and permit package delivery. In a hotel-like environment, a recipient could swipe their room key through a card reader in order to authenticate. Alternatively, a prospective hotel room resident can provide biometric data such as face image, fingerprint, or voice samples during check-in a biometric. All of these mechanisms require the recipient to take a deliberate action in order to authenticate themselves, may be considered by many to be an unwarranted invasion of privacy, or may require unconventional user actions that are difficult to learn or perform.

DETAILED DESCRIPTION

Embodiments can include systems, methods and devices for the authentication of designated persons at particular locations. In some embodiments, systems include low cost sensor systems and can interact with entryways or geographic locales. In certain embodiments, sensor systems can be configured to assist in authenticating people or areas such as an open doorway or entryway threshold prior to delivering items.

Figure 1:
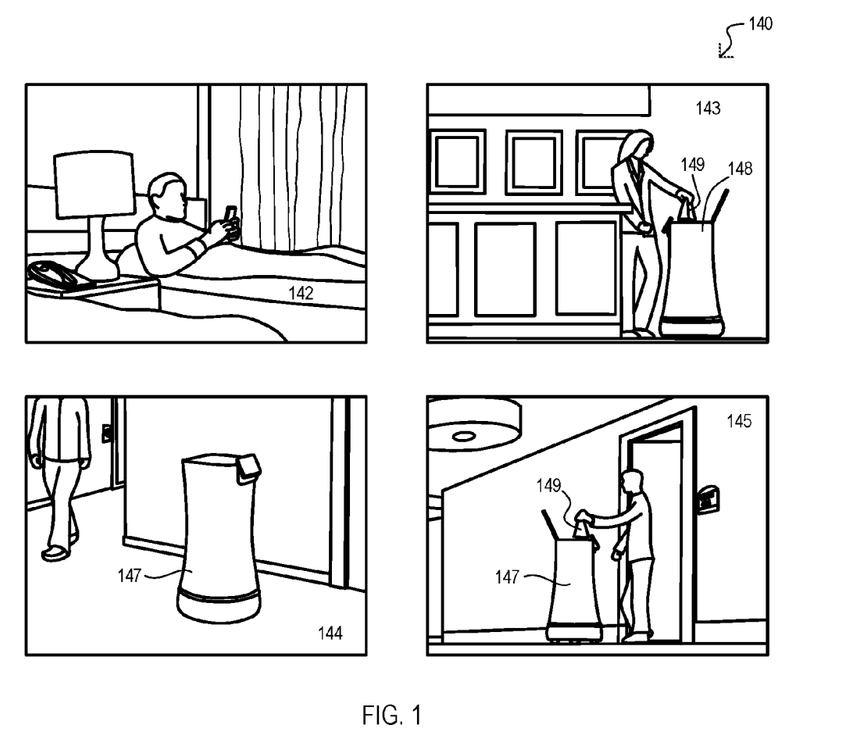
FIG. 1 show the authentication and delivering of an item to a person according to an embodiment.

FIG. 1 shows a series of panels illustrating methods and systems according to particular embodiments. In the embodiment shown, the system can execute a method for authenticating and delivering an item to a person.

A method 140 can include a person, located in a predetermined area, ordering one or more items. In the embodiment shown, as seen in a first panel 142, in particular embodiments, this can include a hotel guest ordering an item such as food, drinks, snacks, toiletries, magazines, books, or other miscellaneous items. Ordering can be accomplished using any suitable method, including but not limited to using a mobile applet for a tablet or phone, a web page interaction, a television cable interface, or by simply calling a concierge or hotel employee A method 140 can further include an order be received and the particular item(s) placed in a securable storage container of a robot. Such actions can be executed with a purely automated system, or in part with the assistance of people. In the embodiment shown, as seen in a second panel 143, an order can be received by a person (e.g., concierge) at a location within a hotel, the desired item(s) 149 can be found (e.g., in a hotel store or stockroom), and then placed into a top accessible, lockable container 148 of a mobile robot 147. Once item(s) are placed a securable storage container of the robot (e.g., 148), the container can be closed and locked. Such a closing/locking can be an automated operation, one executed by a person, or combinations thereof.

A method 140 can further include a robot, which securely contains delivery items, being directed to a delivery location. Such an action can include the robot receiving destination information by any suitable means. In a particular embodiment, upon receiving the item(s) a robot 147 can be directed to the room corresponding to the order (the designated room). In some embodiments, this can also be an automated step, with the designated room information being sent to the robot 147 via a wired or wireless connection. In a particular embodiment, a person (e.g., concierge) can direct the robot 147 to proceed to a designated room by manually entering a room number in an interface mounted on the robot 147, including but not limited to a tablet-type interface or keyboard.

A method 140 can also include a robot autonomously navigating from the location at which it received its item(s) to a designated delivery location. Such an action can include avoiding stationary and moving objects along the way. In some embodiments, this can include navigating a building, a campus of multiple buildings, or an ever larger geographical area. In the embodiment shown, as seen in a third panel 144, a robot 147 can autonomously navigate through hallways of a hotel, avoiding other guests or objects potentially blocking a route to the designated room.

A method 140 can further include a robot arriving at the deliver location and stopping at a particular zone associated with the location. In some embodiment, a notification can be generated to signal the arrival of the item(s). Following an authentication action, the securable storage container enables the item(s) to be removed. This can include, but is not limited to, the storage container opening or becoming unlocked. In the embodiment shown, as seen in a fourth panel 145, a robot 147 can arrive at a destination zone, which can be the front of the ordering guest's door. A notification can be given to the guest to indicate the arrival of the item(s). In some embodiments, this can include a person (e.g., concierge) contacting the guest to inform them of the robot's presence at the door (e.g., phone, electronic message, etc.) or an automated message can be sent to the guest (e.g., mobile applet or other electronic interface can signal the guest of the robot's arrival). In certain embodiments, in addition or alternatively, the robot 147 can provide a suitable notification, including visual or audio signals such as those generated by on-board speakers of the robot, a tablet with speakers mounted to the robot, or the like. In still other embodiments the robot can be maneuvered to physically knock the door to provide a notification. When the door opens, the robot 147 can complete authentication and unlock and open a lid to allow pickup of the item(s) by the guest. Authentication can include, but is not limited to, identifying that the door has opened, alone or in conjunction with additional electronic or biometric identification techniques.

Figure 2A:
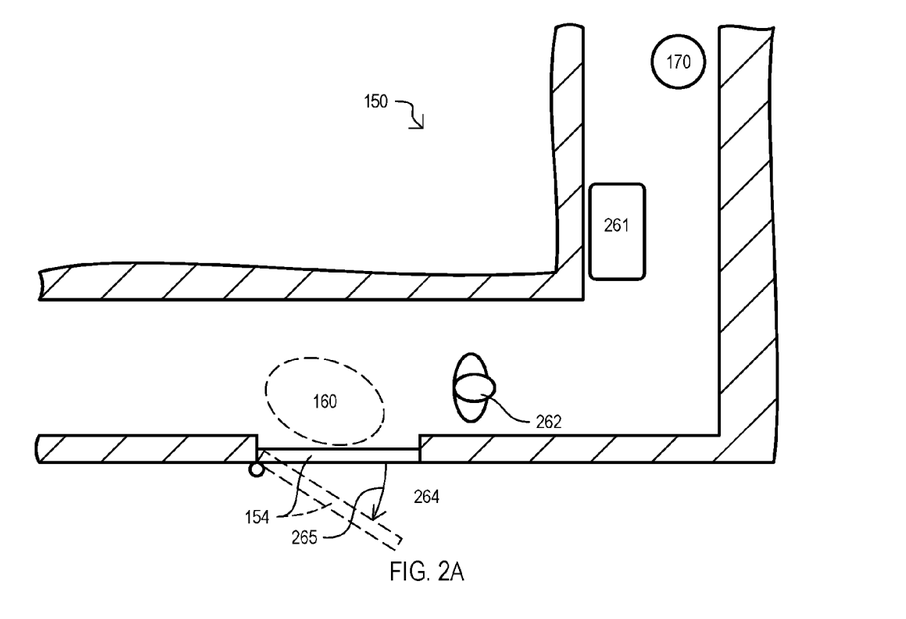
FIGS. 2A, 2B, and 2C respectively illustrate movement of a robot through an area containing obstacles to a delivery zone, and unlocking and opening of a container to complete delivery according to an embodiment.
Figure 2B:
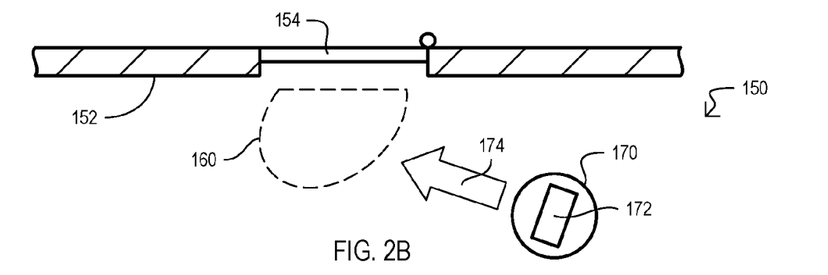
Figure 2C:
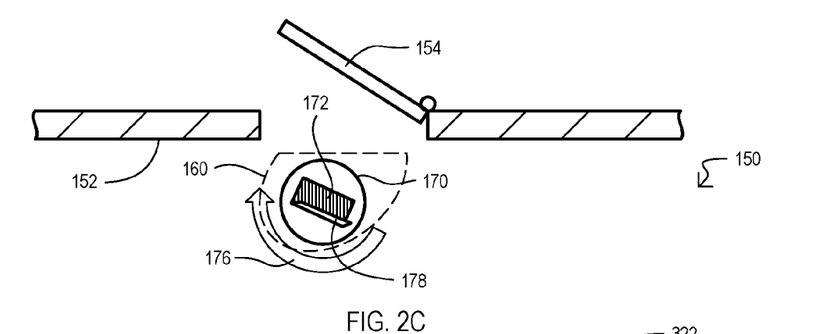

FIGS. 2A, 2B and 2C are a series of top-down looking cartoon views showing movement of a robot through an area containing obstacles to a delivery zone, the and unlocking and opening of a container to complete delivery according to an embodiment.

In some embodiments, a robot containing item(s) for delivery can evade stationary and moving obstacles to reach a delivery zone. In the embodiment of FIG. 2A, a robot 170 can navigate through a hallway 150 with various obstacles, to a delivery zone position adjacent to a door. Such an operation can include the robot 170 maneuvering through a hallway 150, navigating to evade obstacles such as a cart 261 and a person 262, in order to position itself in a destination zone 160 in front of a doorway 264 with an inwardly openable door 154, as indicated by door open angle 265.

In some embodiments, features at a delivery location can be used to identify and/or confirm a delivery zone. In the embodiment of FIG. 2B, a robot 170 can maneuver to a delivery zone 160 adjacent to a door 154. As seen in FIG. 2B a hallway 150 can be bounded on one side by a wall 152 having a door 154 into a room. A robot 170 having a locked container 172 can autonomously navigate in a direction indicate by arrow 174 to a delivery zone 160 outlined by dotted lines, with the delivery zone 160 being in front and slightly to the side of the door 154.

In some embodiments, a robot can arrive at a delivery zone and enable delivered item(s) to be retrieved. In particular embodiments, a robot can orient itself in a predetermined fashion to provide easy access to the item(s). In the embodiment of FIG. 2C, once it has arrived at delivery zone 160 adjacent to the door 154 corresponding to the ordering guest's room, a robot 170 can unlock and open the container 172 to complete delivery upon door opening. In a particular embodiment, a robot 170 can navigate to the delivery zone 160 and rotate in place (indicated by arrow 176) to present the container 172 in a position easily retrievable by the guest. When the door 154 opens, the robot 172 can complete authentication (using the opening of the pre-selected door as a portion of the authentication process) and can unlock and open lid 178 to allow pickup of the item(s) resting in the container 172 by the guest.

While embodiments show a delivery zone that is relative to a door in a hotel, any suitable location can serve as a delivery zone. For example, an entryway or threshold area, a defined delivery zone, designated restaurant tables, guest occupied reception or meeting room chairs, poolside lounges, or even a biometrically identified guest can be serve as, or be used to derive, a delivery zone.

While embodiments show a robot delivering items to a guest, delivery can be for any other suitable task. For example, a robot can be used to deliver cleaning supplies or materials to carts of cleaning staff, while in other embodiments robots can deliver items to other robots for later pickup.

To identify a delivery zone or assist in the identification of a delivery zone, a robot can use image sensors, depth sensors, position sensors, or the like. The sensors can be used to identify room numbers and determine if opening of a door has occurred. Active or passive identification systems can be used, including but not limited to RFID tags, Bluetooth beacons, QR coded markings, ultrasonic emitters, or other suitable area or target identification mechanism or marking system. While such sensors can be mounted on the robot itself, in some embodiments, all or a portion of the sensors can be separate from the robot, but can transmit sensor data to the robot, or have such data be retrieved by the robot.

In one operational embodiment for determining the designated delivery zone and assisting in authentication, the robot can use a precomputed (if door sizes are standardized) or locally determined three dimensional (3D) door opening model. For example, once the robot 170 is localized in front of a door, it can detect the state of the door (open or closed) by using depth or other suitable 3D sensors to measure door dimensions and position. Typically, a door is positioned on a plane that is perpendicular to the floor, and rotates on hinges. As the door opens and closes, it sweeps out an arc along the floor. The 3D sensor data is fit to this model of the door and its surrounding walls. By comparing the orientation of the sensed door plane to the detected walls and the map, the robot estimates the angle of the door, determines whether it is in an open or closed state, and can determine whether or not the door opening will contact the robot. The robot can use the model to position itself in a position that allows for ease of delivery, while preventing contact with the opening door. In certain embodiments the robot can position itself in a non-blocking position to allow entry or exit of guests through the doorway even during delivery.

In some building types, such as hotels, doors are normally locked and often open inward. A person present in the room, or a person who can open the door has been authenticated to a certain extent by the hotel. For hotel delivery of inexpensive items, this level of authentication can be sufficient for many applications. In practice, the robot may be programmed to unlock a bin or cargo carrier so that a person can remove its load once the robot detects that the door is open. Individual hotels or institutions can augment this authentication technique with others if needed, such as asking the person receiving the delivery to sign on a tablet, by use of a tablet mediated video interface with a hotel employee, detection of a guest key card with RFID or magnetic strip, personal identification number (PIN) generated for a guest at check-in, or other suitable means. More advanced biometric techniques including but not limited to fingerprint, voice analysis, or facial image identification can also be used.

In some embodiments, removal of a delivered item can be presumed, and the lid automatically closed and relocked. In other embodiments, active measures can be utilized to confirm the item(s) have been removed, including but not limited to weight or pressure sensors, RFID tags, imaging, ultrasonic sensors can be removal of item attached is detected.

As will be appreciated, various procedures can be used for deliveries. For example, in some embodiments, one or more types of delivery may not require a locked container, with the robot simply being loaded with an item and autonomously maneuvering to a delivery zone, authenticating (i.e., detecting when the door opens), and the item(s) can be presented for delivery.

In another delivery procedure, an item(s) can be placed in lockable container inside or to one side (e.g., rear) of a robot, where the robot can maneuver to a delivery zone (e.g., door), authenticate (e.g., interact with a guest), and rotate to present a side or rear container holding item(s) for delivery.

Figure 3:
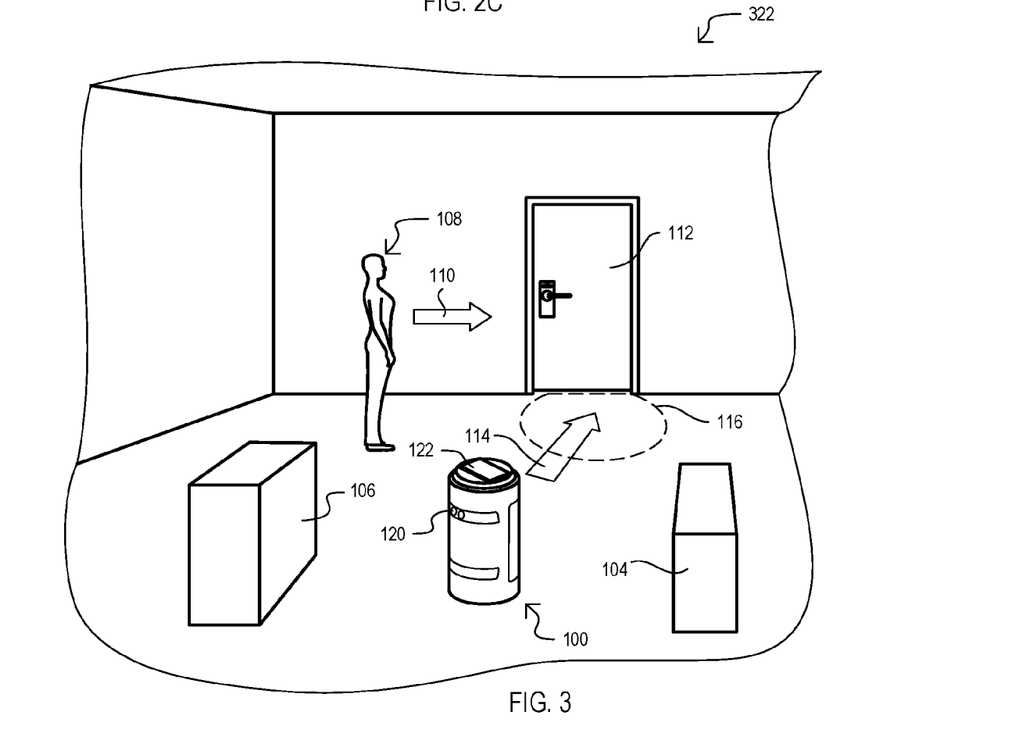
FIG. 3 is a cartoon illustrating operations of a robot in an indoor environment according to embodiments.

FIG. 3 is cartoon showing operations of a system, and corresponding method, in which a robot can move in an indoor environment, such as a hallway or room, even in the presence of potentially blocking objects or people moving through the area. Referring to FIG. 3, delivery robot 100 can autonomously move in a room or hallway environment 102 that includes multiple fixed objects 104 and 106, as well as a movable object such as person 108 moving toward a door 112 in a direction indicated by arrow 110.

In some embodiments, in addition to translational movement along a floor of the environment 102, a robot 100 can execute rotational movement up to and through 360 degrees, permitting environment scanning with sensors fixedly mounted or having a limited movement.

A robot 100 can include at least one image based depth sensor 120. In the embodiment of FIG. 3, robot 100 can be moving in a direction indicated by arrow 114 to a target destination zone 116 in front of the door 112. In a manner similar to that discussed with respect to FIGS. 2A, 2B, 2C, upon reaching the target destination zone, deliveries held in a lockable container 122 can be removed by a room occupant (not shown). In FIG. 3, lockable container 122 can be built into the top of the robot 100.

A depth sensor 120 can be fixed or movably mounted near or at a top of the robot 100. In some embodiments, a key area to sense during obstacle avoidance can be the area directly in a movement path of the robot 100, particularly the area directly in front of the robot 100. In such embodiments, depth sensors 120 can be directed generally downward or outward, with a field of view typically maintained to include an area into which the robot 100 is moving. If a depth sensor is mounted such that it points directly downward, then about half of its field of view can be filled with the robot's frame and the remaining half can be used for obstacle detection. A depth sensor can also be mounted out and down at an angle of up to FV/2 from vertical (where FV represents the field of view of the camera) to maximize viewable area for obstacle detection.

Depth sensors can use any suitable depth sensor technology, but in particular embodiments, can include components similar to or derived from video gaming technology, enabling three dimensional sensing at a much lower price point than traditional laser-based sensors. Examples of these sensors include the Microsoft Kinect, Primesense Carmine, and SoftKinetic DS325. Such low cost depth sensors typically direct infrared light to bounce off objects in front of the sensor in order to determine how far those objects are from the sensor; while further incorporating an RGB video camera to allow the depth image to be combined with the video image.

Compared to commonly available laser sensors, such lower cost depth sensors have a much narrower field of view (typically less than 90°), a much shorter effective range of depth detection (around 1-3 meters), and often have a "dead zone" with limited or absent depth ranging within a half meter or so of the depth sensor. In some embodiments, the mounting one or more such low cost depth sensors on a robot, as described, can overcome limitations associated with a typically narrow field of view and other depth sensor limitations.

In certain embodiments, a depth sensor mounted on a robot can be movable, with hinged, rail, hydraulic piston, or other suitable actuating mechanisms used to rotate, elevate, depress, oscillate, or laterally scan with the depth sensor. In still other embodiments, multiple depth sensors are used and generally directed so that forward, backward, upward and downward regions are monitored.

In certain embodiments, conventional RGB CMOS or CCD sensors can be used, alone or in combination with narrowband, wideband, polarization or other spectral filters. In other embodiments infrared, ultraviolet, or other imaging focal plane array devices can be used to allow for hyperspectral image processing. This allows, for example, monitoring and tracking of guides, markers, or pathways that are not easily visible to people.

In operation, systems can make use of ambient light such as sunlight, incandescent, halogen, LED, fluorescent or other commonly available artificial source that may illuminate the environment in which robot 100 moves. In certain embodiments, the robot can have one or more attached (movable or fixed) light sources to augment ambient light intensity and/or provide wavelengths not available in the ambient light source and/or as a substitute for ambient light in dark environments. Such optional light sources may be mounted along with or separately from the depth sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light source. Various light shields, lenses, mirrors, reflective surfaces, or other optics can provide wide light beams for area illumination or tightly focused beams for improved local illumination intensity.

In some embodiments, interaction with the robot can be provided by local input or network interface. Local input can be through a touchpad, by voice or gesture control, or by dedicated remote controllers, as but a few examples. In particular embodiments, local user input can include a robot mounted pad hard or soft keyboard, touch sensitive element (which may be integrated as part of the optional display, or similar to provide for user input, voice control, or camera mediated user gestural control.

In some embodiments, a robot can provide for local display of its operations. Such a local display can show status, functionality, and error messages, or the like. Any suitable display can used, including but not limited to a touchpad display. A display can be a conventional LCD, a bistable displays (such electronic paper or similar) or OLED or other suitable display.

In certain embodiments, a wired or wireless connect subsystem can be used to connect to another user interaction device such as a laptop, tablet, or smart phone (not shown).

Optionally, data and control signals can be received, generated, retrieved, or transported between varieties of external data sources, including wireless networks or personal area networks, cellular networks, or Internet or cloud mediated data sources. In addition, robot 100 may include a source of local data (e.g., a hard drive, solid state drive, flash memory, and/or dynamic memory, such as DRAM or SRAM) that can allow for local data storage of user-specified preferences or protocols. In one particular embodiment, multiple communication systems can be provided. For example, a robot can be provided with a direct WiFi connection (802.11b/g/n), as well as a separate tablet enabled 4G cell connection provided as a back-up communication channel. Similarly, tablet or robot mounted Bluetooth or other local communication systems can be used to identify pre-positioned radio beacons, or to form a part of a user interface via a user smartphone or tablet.

In some embodiments, when a robot autonomously moves to conduct a task, the robot can use localization technology for tracking its current position. A typical example of localization technologies is a simultaneous localization and mapping (SLAM) technique. A mobile robot uses SLAM to detect information of the surroundings (i.e., work space) where it conducts tasks, and can process the detected information to construct a map corresponding to the work space while at the same time estimating its absolute position. In certain embodiments, position indicating objects can be deployed in the work space to enable or assist in localization. Position indicating objects can include, but are not limited to, Bluetooth beacons, radio beacons, light emitting devices, and/or visible patterns can be placed at particular sites or objects to assist robot navigation.

According to embodiments, a robot 100 can carry a wide range of amenities and supplies in various optional lockers, shipping containers, or shelving units, including food and beverages. Some of these supplies (especially beverages) may spill or be damaged if the robot does not move smoothly and gently. This problem is especially acute when the robot starts and stops, particularly during emergency stops (e.g. when someone jumps into its path). In one embodiment, a robot can be controlled to gently accelerate and decelerate, minimizing the forces felt by the payload. Since off-the-shelf motor controllers do not typically have the fidelity to smoothly decelerate multiple motors (wheels) simultaneously, a high-frequency (e.g., 1000 Hz) motor control loop systems can be used to enable smooth robot movement.

According to embodiments, in operation, a robot 100 can detect movement of a person 108 (see FIG. 3, for example) and slow down or halt until the person 108 is no longer in the desired movement path of the robot 108.

Figure 4:
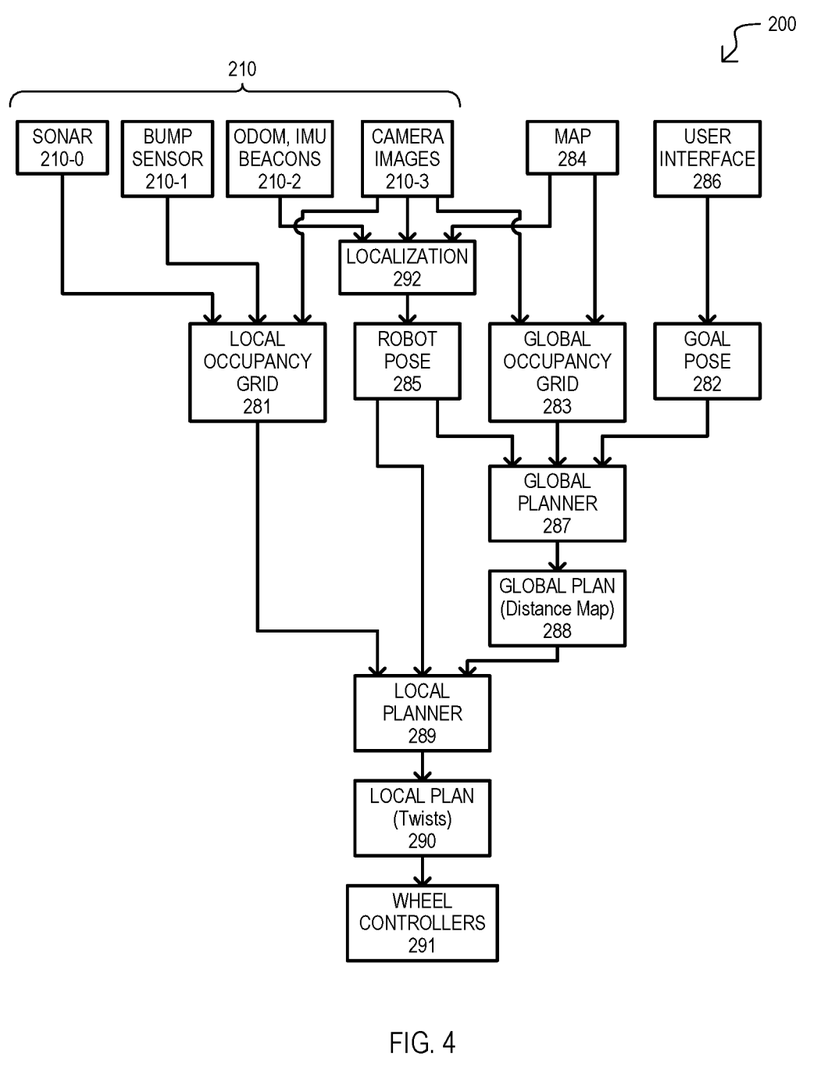
FIG. 4 is a flow diagram illustrating data processing steps for obstacle avoidance and navigation of a robot that can be included in embodiments.

FIG. 4 is a flow chart illustrating process steps for autonomous robot navigation through a work space (e.g., building) with variously positioned movable and non-movable items, people, and target. As seen in flow chart 200 of FIG. 4, a sensor suite 210 can include sonars 210-0, bump sensors 210-1, odometers 210-2, inertial measurement units (IMU) 210-2 configured to work with light or radio beacons, and camera systems capable providing video or multiple still images. Sensor data from the camera images 210-3 and/or odometers 210-2 and position beacons can be used to localize position of the robot 292 and provide local knowledge of object position in the environment around the robot (local occupancy grid 281).

Data from a sensor suite 210 can also be used in conjunction with a map 284 and directions provided through a user interface 286 to define a suitable navigation pathway to the target destination (goal pose 282) of the robot. The map 284 can include part of a global occupancy grid 283 that integrates known positions of objects in the mapped area, and in conjunction with robot pose input 285 and the goal pose 282 can be used to globally plan 287 robot navigation. The global plan is reduced to a distance map 288, which is in turn combined with integrated data of local object position from the local occupancy grid 281 and the robot pose 285 in a local planner 289 that adjusts the global plan to avoid or go around blockages or obstructions in the robot path. Local sensing and re-orientation of the robot (twists 290) can verify local paths, and provide control input to the wheels 291 for partial or full rotation of the robot, or backward or forward movement that avoids objects or people while travelling to a desired destination.

Figure 5:
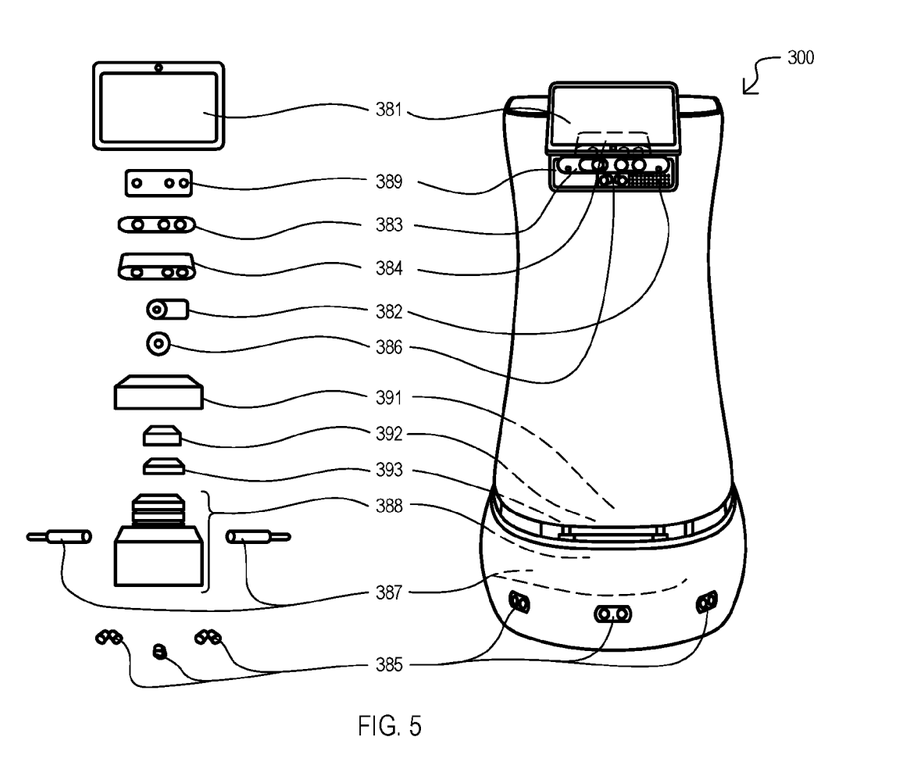
FIG. 5 is one example of a robot that can be included in embodiments.

FIG. 5 is an exploded view showing selected electrical components of a robot 300 that can be included in embodiments. A robot 300 can have a generally cylindrical shape about a vertical midline. Advantageously, this shaped can simplify movement calculations and can simplify rotation in place since position and potential interactions of objects with extending arms or the like do not have to be determined.

In the embodiment shown, a touch tablet display 381 for user input or messaging can be mounted at the top of the robot 300 at an angle convenient for viewing and user input. In addition to a visible display, a tablet can be used for speech input/output, and for processing and controlling robot 300. A separate speaker 382 can also be used for providing audible instructions or notices.

A lockable cargo container can be positioned behind the tablet, and can be controlled to unlock for delivery to a recipient only when a destination has been reached and authorization to unlock received.

A robot 300 can supports multiple fixed depth sensors, including a forward looking depth sensor 383 and a downward looking depth sensor 384 mounted adjacent to each other. In the disclosed embodiment, the depth sensors 383/384 can be fixedly mounted in a manner that does not require turret or movable actuators. In some embodiments, depth RGB cameras 389 can also be mounted next to the forward and down looking depth sensors 383/384.

Other sensors can include a base mounted sonar array 385 and a wide angle sonar 386 mounted near the top of the robot 300. An x86 391 or similar central processing unit can be used in conjunctions with a micro controller 392 and motor controllers 393 for local control of movement of the robot. Differential drive motors 387 powered by batteries 388 (lithium or other rechargeable battery systems being preferred) provide power for movement, and wheels (not show) support the robot 300.

In particular embodiments, a robot 300 can be sized to have a height of between 0.8 to 2 meters (with height between 1.2 to 1.5 meters preferred), and a diameter of between 30-60 centimeters (with a preferred width of between 40-50 centimeters), permitting the robot 300 to easily move through hallways and doorways. A drive mechanism can includes separate motors 387 attached to each 6 inch diameter wheel in a differential drive configuration, allowing for a robot velocity of 1.5 meters/second, and the ability to move up and down ramps, as well as on level ground.

Figure 6A:
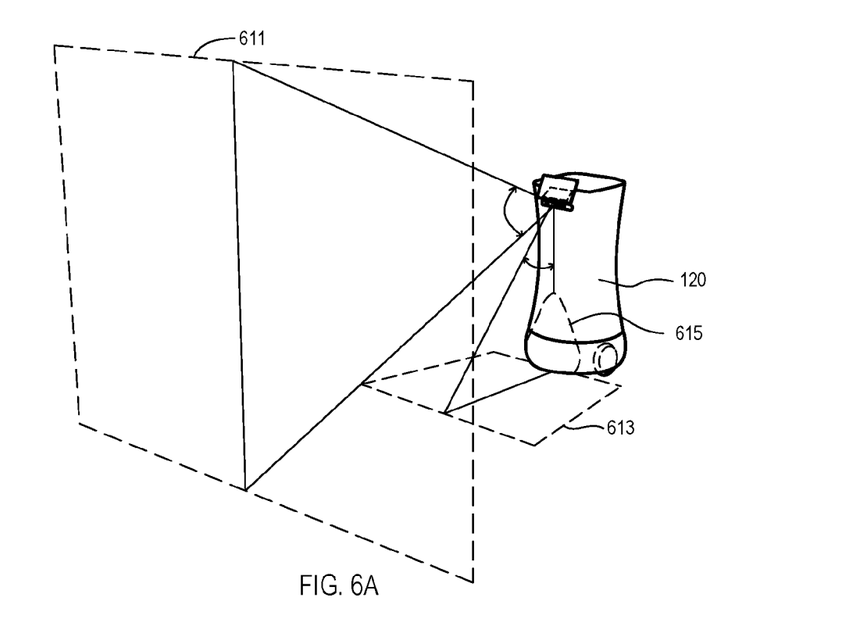
FIGS. 6A and 6B are diagrams showing fields of view of a robot like that shown in FIG. 5.
Figure 6B:
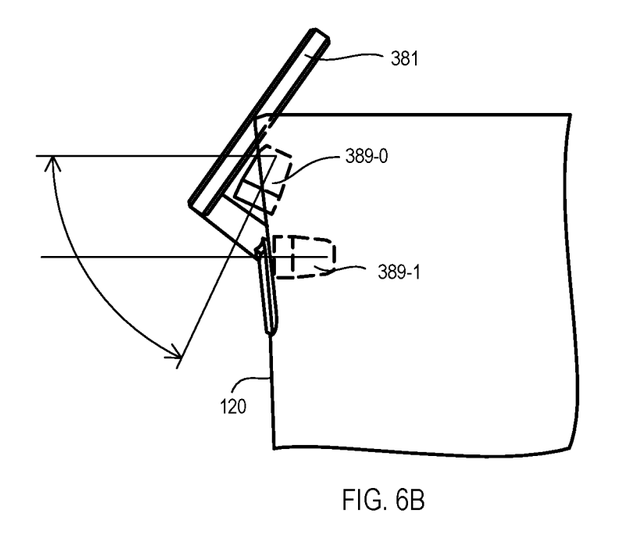

FIGS. 6A and 6B show fields of view that for a robot like that of FIG. 5. Near a top of the robot can be depth cameras, such as two RGB depth cameras fixedly mounted to the robot and adjacent to each other (within a few centimeters). Both of these depth cameras can produce color images with corresponding depth information. The cameras can be mounted at the front of the top of the robot 120. In some embodiments, this can be 80 cm to 85 cm above the floor. One camera can be pointed directly ahead. The other camera can be angled down to see the floor directly ahead of the robot. In some embodiments, such a camera can be angled at 65 degrees below horizontal.

In a very particular embodiment, a field of view for each camera can be 57 degrees in the horizontal direction and 45 degrees in the vertical direction. The near edge of the field of view for the downward pointed camera intersects the lower portion of the base. The pear-shaped line 615 on the front of the robot 120 in FIG. 6A shows the edge of the field of view as it intersects the curved shell of the robot. The trapezoid shape 613 on the floor in front of the robot shows the area visible to the downward facing camera. The vertical trapezoid 611 in front of the robot shows the area visible to the forward facing camera.

FIG. 6B shows a top of robot 120 in a transparent view. A tablet display 381 is shown, as well as a downward facing camera 389-0 and forward facing camera 389-1.

It will be apparent to those skilled in the art that various modifications and variations can be made without departing from the spirit or scope of the invention. Thus, it is intended that the disclosed embodiments cover modifications and variations that come within the scope of the claims that eventually issue in a patent(s) originating from this application and their equivalents. In particular, it is explicitly contemplated that any part or whole of any two or more of the embodiments and their modifications described above can be combined in whole or in part.

It should be appreciated that reference throughout this description to "one embodiment" or "an embodiment" means that a particular feature, structure or characteristic described in connection with the embodiment is included in at least one embodiment of an invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

It is also understood that other embodiments of this invention may be practiced in the absence of an element/step not specifically disclosed herein.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A system, comprising:
    at least one robot configured to autonomously navigate from a first location to a destination zone, the at least one robot having a generally cylindrical shape and including
    a storage container for storing at least one item for delivery,
    a plurality of image based depth sensors mounted proximate a top end of the robot, and
    a controller configured to navigate to the destination zone and to authenticate a delivery target for the item and to authenticate the delivery target in response to at least the detection, by the robot, of an open door at the destination zone.

2. The system of claim 1, wherein:
    the delivery target is a person; and
    the controller is configured to further authenticate the delivery target by a human interface.

3. The system of claim 1, wherein:
    the controller is configured to further authenticate the delivery target via a video interface included with the robot.

4. The system of claim 1, wherein:
    the delivery target is a person that is given an identification item; and
    controller is configured to further authenticate the delivery target via the identification item.

5. The system of claim 1, wherein:
    the identification item is selected from the group of: a room key, a personal identification number.

6. The system of claim 1, wherein:
    the storage container is lockable; and
    the controller is further configured to unlock the container once authentication is complete.

7. The system of claim 1, wherein:
    the storage container is lockable; and
    the controller is further configured to open the container once authentication is complete to display the item.

8. The system of claim 1, wherein:
    the controller is further configured to rotate to place the storage container in a particular orientation with respect to the destination zone.

9. The system of claim 1, wherein:
    the at least two depth sensor cameras are mounted on one side of the robot;
    the storage container is located on a different side of the robot than the at least two depth sensor cameras; and
    the controller is further configured to rotate to present the storage container in a particular orientation with respect to the destination zone.

10. The system of claim 1, further including:
    the robot is configured to operate in a work space; and
    a plurality of position indicating objects located in the work space; wherein
    the controller is configured to determine a location of the robot based, at least in part, upon detecting the position indicating objects.

11. The system of claim 1, further including:
    the robot is configured to operate in a work space; and
    a communication network covering at least a portion of the work space; wherein
    the controller is configured to receive item ordering data over the network.

12. A method, comprising:
    storing at least one item in a storage container of a robot having a generally cylindrical shape;
    delivering the at least one item to a destination zone with the robot via autonomous navigation, the autonomous navigation including determining the presence of obstacles in the robot's path with at least one forward facing image based depth sensor;
    attempting to authenticate a delivery target for the item by the robot detecting an open door at the destination zone; and
    when the delivery target is authenticated, presenting the item to the delivery target by operation of the robot.

13. The method of claim 12, wherein:
    attempting to authenticate the delivery target further includes actions selected from the group of: receiving a predetermined input from a person at a human interface on the robot; a video interface transaction;

input of an identification given to a person at an operating location of the robot.

14. The method of claim 12, wherein:
the storage container is lockable; and
the controller is further configured to unlock the container once authentication is complete.

15. The method of claim 12, wherein:
presenting the item to the delivery target includes actions selected from the group of: unlocking the storage container and opening the storage container to display the item.

16. A robot for delivering items to a destination zone, comprising:
a generally cylindrical shape;
lockable storage container;
at least two image based depth sensor mounted proximate a top end of the robot having different vertical field of view orientations;
a controller configured to determine if a door in front of the robot has been opened; and
an authentication system to authenticate a delivery target for the item in response to the robot detecting the opening of a door at a destination zone.

17. The robot of claim 16, further including:
a human interface device for receiving inputs from a person; and
the authentication system authenticates the delivery target further in response to inputs from the human interface device.

18. The robot of claim 16, further including:
the authentication system authenticates the delivery target further in response to personal identification items given to persons by an establishment operating the robot.

* * * * *